April 17, 1934.  F. P. CULLEN  1,955,536
UNLOADER
Filed Sept. 10, 1932  2 Sheets-Sheet 2
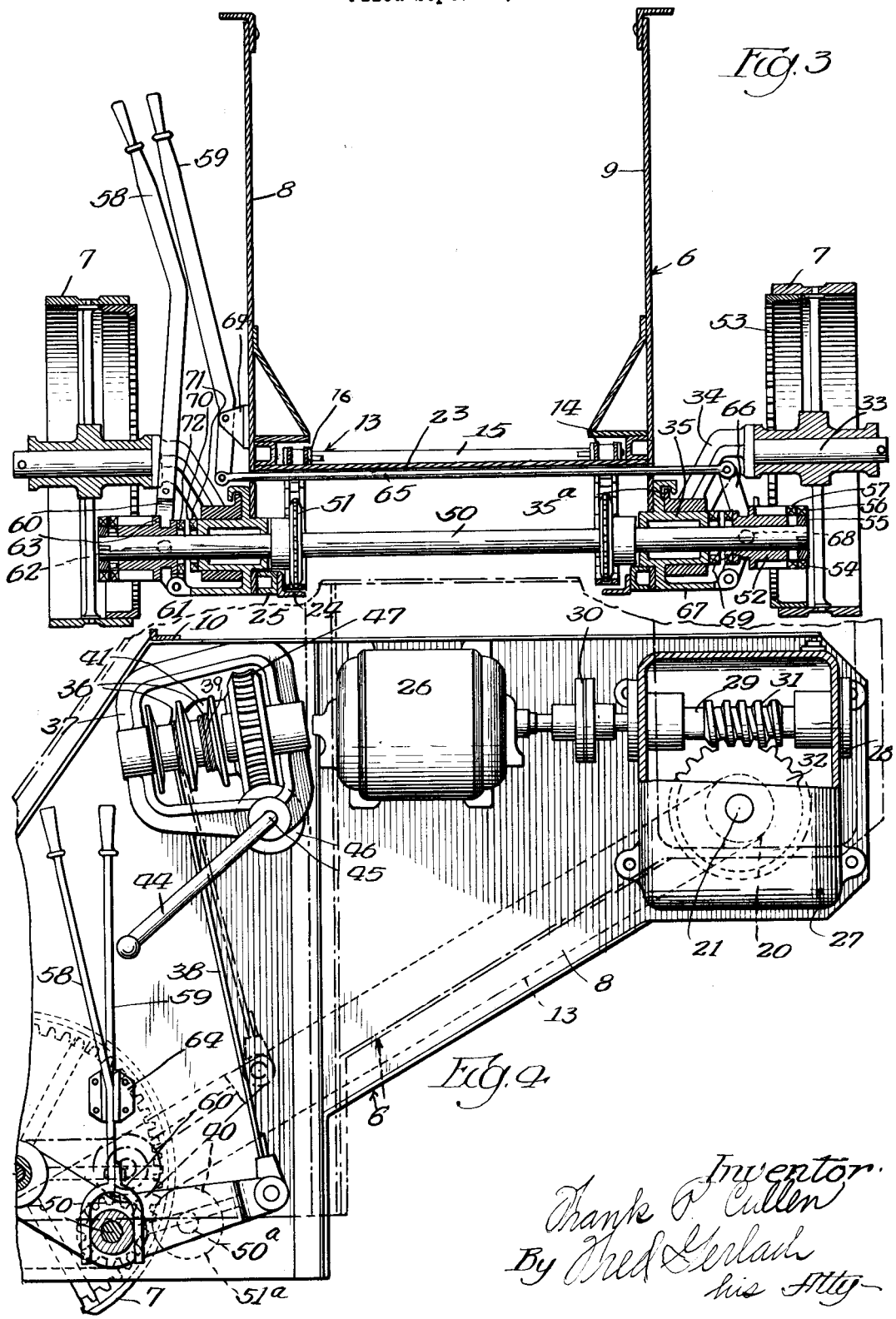

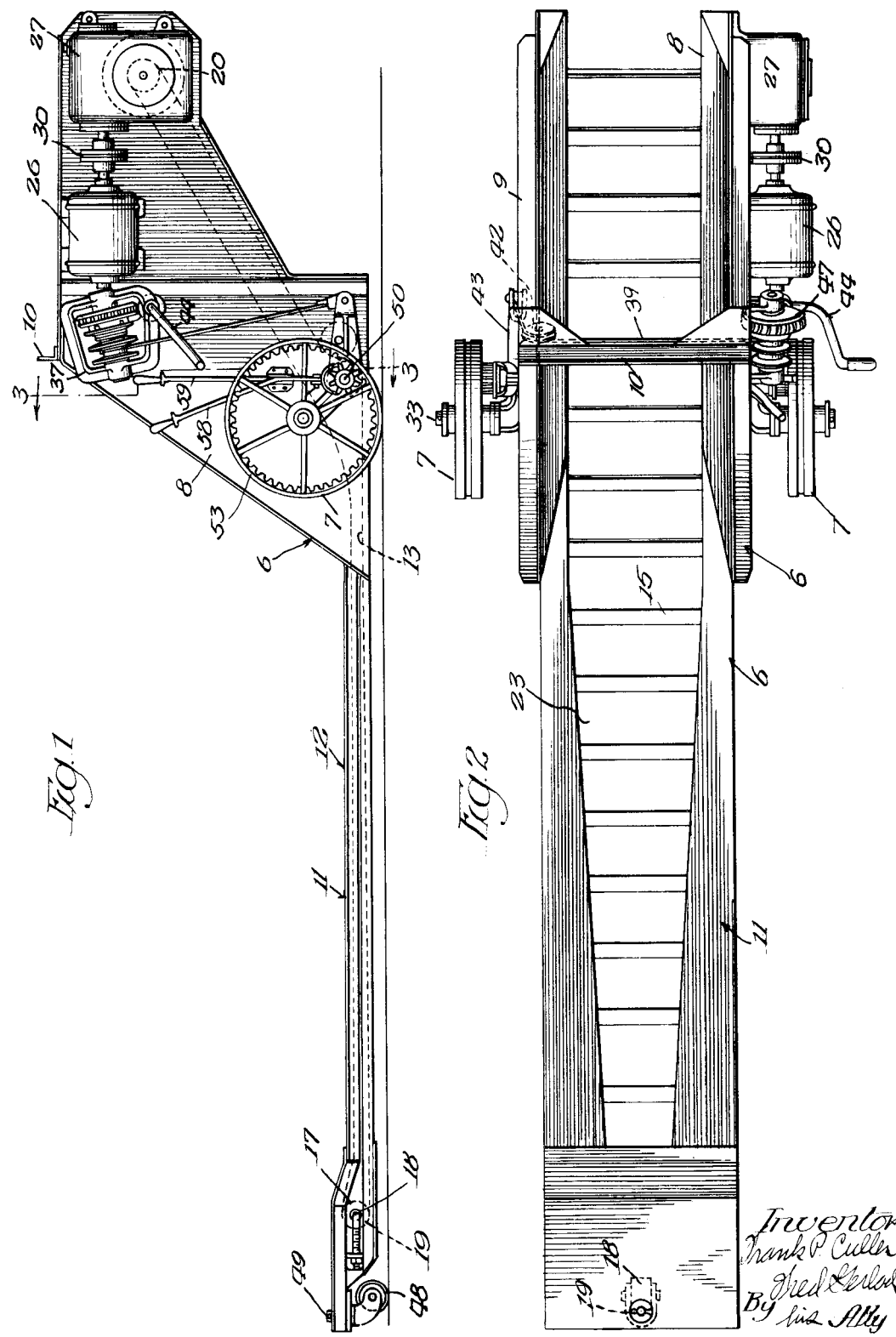

Patented Apr. 17, 1934

1,955,536

UNITED STATES PATENT OFFICE 1,955,536

UNLOADER

Frank P. Cullen, Chicago, Ill.

Application September 10, 1932, Serial No. 632,499

14 Claims. (Cl. 198—53)

The present invention pertains generally to unloaders. More particularly, the invention pertains to that type of unloader which is designed primarily for use in unloading a railroad car and comprises (1) a wheel-supported frame which is extended at the front end thereof so as to fit beneath the chute or drop of the car and over the railroad tracks; (2) an endless, chain-and-drag type conveyor which extends longitudinally of the frame and is adapted upon drive thereof, to convey the material dropped through the chute or drop from the front end of the conveyor to the back end; and (3) a motor which is mounted on the frame and operates through speed reducing gearing to drive the endless conveyor.

One object of the invention is to provide a car unloader of this type in which the motor for driving the conveyor is located at the back end of the frame and is mounted on and projects outwardly from one of the sides of the frame in such a manner that it is readily accessible for repair or replacement purposes, and does not cause any increase in the height of the frame or become fouled.

Another object of the invention is to provide a car unloader of the aforementioned type which embodies simple and improved mechanism for driving the wheels from the motor in order that it may be moved readily from one place to another.

Another object of the invention is to provide an unloader of the last mentioned character in which the mechanism for driving the wheels comprises a horizontally extending shaft which is driven directly from the chain of the conveyor and operates to drive the wheels through the medium of pinions in the ends of the shaft and internal gears on the wheels.

Another object of the invention is to provide a car unloader of the character under consideration in which the pinions of the wheel-driving mechanism are mounted loosely on the ends of the horizontally extending shaft, mesh at all times with the internal gears on the wheels and are shiftable into locked relation with jaw clutches on the ends of the shaft in order to connect them for drive by the shaft and result in the transmission of power to the wheels for conveyor-moving purposes.

Still another object of the invention is to provide an unloader in which the wheel-driving mechanism comprises levers at one side of the frame whereby the pinions may be shifted individually into and out of locked relation with the jaw clutches in order to permit of drive of either of the wheels when it is desired to turn the unloader, and further comprises clutches for locking the pinions against rotation when they are declutched from the driving clutches.

A further object of the invention is to provide a car unloader of the hereinbefore specified character in which the wheels are mounted on cranks which are journalled about the horizontally extending shaft of the wheel-driving mechanism and permit the frame to be raised and lowered without disconnecting the pinions from the internal gears on the wheels.

A still further object of the invention is the provision in a car unloader of the type under consideration of simple and improved means for swinging the cranks for frame-adjusting purposes.

In addition, it is contemplated as one of the objects of the invention to provide a car unloader which is generally of new and improved construction and may be manufactured at a low and reasonable cost, and in which facility of adjustment is combined with compactness and durability of construction.

Other objects of the invention and the various advantages and characteristics of the present car unloader will be apparent to those skilled in the art from a consideration of the following detailed description.

The invention consists in the several novel features which are hereinafter set forth and are more particularly defined by claims at the conclusion hereof.

In the drawings which accompany and form a part of this specification or disclosure and in which like numerals of reference denote corresponding parts throughout the several views:

Figure 1 is a side elevation of a car unloader embodying the invention;

Figure 2 is a plan view;

Figure 3 is a vertical transverse section on the line 3—3 of Figure 1, showing in detail the construction and arrangement of the mechanism for driving the wheels from the motor;

Figure 4 is a fragmentary side view illustrating the manner in which the cranks for supporting the wheels may be manipulated in order to raise or lower the frame, and exhibiting the construction and arrangement of the motor and speed reducing unit for driving the endless conveyor.

The unloader which forms the subject matter of the invention is designed primarily for use in unloading a railroad car and comprises a frame 6. This frame is supported by a pair of wheels 7 so that it may be moved from place to place, and consists of a pair of laterally spaced sides 8 and 9. These sides are shaped and constructed as illustrated in Figures 1 and 2 of the drawings, and are suitably reinforced and cross-connected by means of angle iron bars 10. A horizontal extension 11 is provided at the front end of the frame. This extension is designed to fit under the chute or drop of the railroad car and over the railroad tracks, and consists of a pair of laterally spaced side members 12. The latter project forwardly from, and are suitably secured to, the front ends of the sides of the frame.

In addition to the frame 6, the unloader comprises an endless conveyor 13 which extends from the extreme front end of the extension 11 to the back end of the frame and consists of a pair of laterally spaced chains 14 and drag bars 15. The drag bars, as shown in Figures 1 and 3, extend between the two chains and are secured by brackets 16 to certain links of the chain. The front or receiving end of the conveyor is supported by a pair of idler sprockets 17. These sprockets are mounted on a horizontally extending shaft 18 and receive the chains 14. The shaft 18 is journalled in bearings 19 which are located at the front end of the extension 11 and are horizontally adjustable in order to take up any slack in the conveyor. The back or discharge end of the conveyor extends upwardly and is supported by means of a pair of drive sprockets 20. These sprockets are mounted on a horizontally extending shaft 21 and receive the rear ends of the chains 14. The shaft 21 extends through the sides of the frame 6 and is journalled in bearings (not shown) which are secured to the outer faces of the frame-sides. The upper reach of the conveyor is supported by means of an elongated plate 23. The front end of this plate is horizontal, as shown in Figure 2, and extends between and is secured to the side members 12 of the extension 11. The rear end of the plate extends upwardly in conformity with the discharge end of the conveyor and extends between and is secured to the sides of the conveyor frame 6. When the unloader is in use, the material with which the railroad car is loaded is dropped onto the front end of the extension 11. During drive of the conveyor, the drag bars 15 drag the material horizontally over the front end of the plate 23 and then upwardly over the rear end of the plate. As the drag bars pass around the drive sprockets 20, the material is discharged from the unloader. The lower reach of the conveyor is supported by means of a pair of laterally spaced angle bars 24. These bars are secured to channel bars 25 and are arranged so that they receive and support the lower reaches of the chains 14. The channel bars 25 are secured in any suitable manner to the side members 12 of the extension 11 and the sides of the frame 6 and extend horizontally at the front ends thereof and upwardly at their rear ends. The conveyor is driven by means of an electric motor 26. This motor is mounted on the side 8 of the frame and operates to drive the horizontally extending shaft 21 through the medium of a speed reducing unit 27. The latter embodies a housing 28 and consists of a horizontally extending shaft 29 which extends through and is journalled in bearings in the housing 28 and is connected by way of a coupling 30 to the rotor shaft of the electric motor 26; a worm 31 which is secured to the shaft 29 and positioned within the confines of the housing; and a worm gear 32 which meshes with and is driven by the worm 31 and is fixedly mounted on one end of the shaft 21. By locating the electric motor and the speed reducing unit on the frame-side 8 as contradistinguished from above or beneath the discharge end of the endless conveyor, the height of the frame is not unduly increased and the various parts are accessible for inspection and repair purposes. Furthermore, there is little, if any, likelihood of the motor becoming fouled by the material conveyed by the conveyor.

The wheels 7 are located outwardly of the sides of the frame and are mounted rotatably on stub axles 33. These stub axles are formed integrally with, and project outwardly from, a pair of cranks 34 which extend radially with respect to and are mounted to rotate on a pair of bearing housings 35. These housings extend through holes in the sides of the frame and are secured in place in any suitable manner. The cranks are held against axial or longitudinal displacement with respect to the bearing housings by means of flanged connections 35ª between the cranks and the housings. By utilizing the cranks 34, it is possible to raise or lower the frame by swinging the cranks with respect to the bearing housings 35. Swinging of the cranks for frame-adjusting purposes is effected by means of a drum 36. This drum is rotatably mounted in a frame 37 on the frame-side 8 and has attached thereto a pair of cables 38 and 39. The cable 38 extends downwardly from the drum and is attached to an arm 40. The latter is formed integrally with the crank for the wheel which is associated with the frame-side 8. The cable 39 extends through aligned holes 41 in the frame-sides 8 and 9 and passes over a sheave 42 and thence downwardly to an arm 43 on the crank for the wheel which is associated with the side 9. The arm 43 is formed integrally with the aforesaid crank and extends so that it is parallel to the arm 40. The sheave 42 is suitably supported on the frame-side 9. The drum 36 is rotated by means of a hand crank 44. The latter is connected to a shaft 45 on the frame 37 and is adapted when turned, to rotate the drum through the medium of a worm 46 which is mounted on the shaft 45 and meshes with a worm gear 47 on the supporting shaft for the drum. When the crank 44 is turned in one direction, the drum is driven so that the cables are wound therearound and operate to swing the arms 40 and 43 so as to effect a raising of the frame. When the crank 44 is turned in the opposite direction, the drum is rotated so that the cables are paid out. During paying out of the cables, the cranks on which the wheels are mounted are permitted to swing in the opposite direction, with the result that the frame 6 is lowered. The drum-supporting frame 36 is mounted directly in front of the electric motor 26, as shown in Figure 1 of the drawings. By virtue of the fact that a worm and worm gear are used between the crank 44 and the drum, no breaking or locking means is necessary for the drum.

The front end of the extension 11 is supported by means of a castor 48. This castor embodies a vertically extending stud which extends through the front end of the extension and is held in place by means of a cotter pin 49. By removing the cotter pin, the castor may be removed when it is not desired, such, for example, as when the extension is supported on the railroad tracks in connection with the unloading of the railroad car.

In order to facilitate and expedite shift of the unloader from one place to another, mechanism is provided for driving the wheels 7 from the electric motor 26. This mechanism is designed to be controlled manually and comprises a horizontally extending shaft 50. This shaft extends through and is journalled in the bearing housings 35 and is driven from the conveyor by means of sprockets 51. The latter are mounted on the central portion of the shaft and mesh with the lower reaches of the chains 14. In order to insure drive of the shaft 50 by the chains 14 of the conveyor, a horizontally extending shaft 50ª is provided. This shaft is positioned parallel to the shaft 50 and in close proximity thereto and is provided with a pair of sprockets 51ª which mesh with the chains 14 and form a wrapped drive for the shaft 50. In addition to the shaft 50, the wheel-driving mechanism comprises a pair of pinions 52 and a pair of internal gears 53. The internal gears are connected to the inner parts of the rims of the wheels. The pinions 52 are loosely and slidably mounted on the ends of the shaft 50 and mesh with the internal gears 53. A driving connection between the pinions and the shaft is effected by means of a pair of jaw clutches 54. These clutches comprise disks 55 which are fixedly mounted on the ends of the shaft 50 and have radially extending teeth 56 for engagement with coacting teeth 57 on the outer ends of the pinions. When the pinions 52 are shifted outwardly the teeth 57 are brought into mesh with the teeth 56 and driving connections are effected between the pinions and the shaft 50 whereby power is transmitted from the motor to the wheels for unloader moving purposes. The pinions 52 are adapted to be shifted individually into and out of clutched relation with the plates 54 by means of a pair of vertically extending levers 58 and 59. These levers are positioned alongside of the side 8 of the frame 6. The lever 58 is provided with a fork 60 at its lower end. This fork is pivotally connected to a bracket 61 on the bearing housing on the frame-side 8. It is operatively connected to the pinion opposite this bearing housing by means of a pair of fingers 62 which extend into a groove 63 in the inner end of the pinion. The lever 59 is pivotally supported on a bracket 64 on the frame-side 8 and is operatively connected to the other pinion through the medium of a horizontally extending push-rod 65 and a forked link 66. The link 66 is pivotally connected to the bracket 67 on the bearing housing on the frame-side 9 and straddles the pinion opposite this housing. It is connected to the pinion by means of a pair of inwardly extending fingers 68 which fit within an annular groove 69 in the inner end of the pinion. The horizontally extending push-rod 65 extends through aligned holes in the frame-sides and is pivotally connected to the lower end of the lever and at its other end, to the forked link 66. By manipulating the levers 58 and 59, both pinions may be shifted into driving position when it is desired to move the unloader rectilinearly. When it is desired to turn the unloader by power, one of the levers is shifted so as to effect a driving connection between one of the wheels and one of the pinions. Turning of the unloader in the opposite direction may be effected by shifting the other lever. By virtue of the fact that the cranks on which the wheels are mounted swing about the shaft 50, there is no displacement of the wheels with respect to the pinions when the frame is raised or lowered and consequently a driving connection is always maintained between the pinions and the internal gears 53.

Because of the length of the unloader, difficulty is sometimes experienced in turning the unloader by applying power to one of the wheels. In order to obviate this difficulty, a pair of clutches 70 are provided. These clutches permit the pinions to be locked against rotation when they are declutched with respect to the jaw clutches 54 and consist of teeth 71 which project outwardly from the outer ends of the bearing housings 35 and are adapted to interlock with teeth 72 on the inner ends of the pinion. When the levers 58 and 59 are shifted so as to declutch the pinions with respect to the jaw clutches 54, the pinions are locked against rotation by way of the clutches 70 and thus prevent rotation of the wheels. When the unloader is turned by shifting one of the levers in order to effect drive of one of the wheels, the other lever may be shifted so as to lock the other wheel.

The electric motor 26 is preferably of the reversible type so that the wheels 7 may be driven in the reverse direction when so desired.

When it is desired to use the unloader, the frame is positioned so that the extension 11 is located under the chute or drop of the railroad car and on the railroad tracks. The frame is so positioned either by shifting it manually or by applying power to the wheels 7 through the medium of the driving mechanism comprising the shaft 50, the pinions 52, the jaw clutches 54 and the internal gears 53. After the frame is properly positioned, the levers 58 and 59 are shifted so as to declutch the pinions 52 with respect to the jaw clutches 54 and lock them by way of the clutches 70 against rotation. In order to start the unloader, current is supplied to the electric motor 26. This causes drive of the endless conveyor 11 and results in the material dropped through the chute of the railroad car being conveyed from the receiving end of the conveyor to the discharge end. In the event that it should be necessary to adjust the extension 11 with respect to the railroad tracks, the crank 44 is turned so as to raise or lower the frame and thus effect the desired adjustment. Upon completion of the unloading operation, the unloader may be moved to any desired place simply by shifting the levers 58 and 59 in order to shift the pinions so as to engage them with the jaw clutches and effect drive of the wheels from the shaft 50. When the unloader reaches the desired location or place, the motor 26 may be stopped or the levers 58 and 59 may be shifted so as to declutch the pinions with respect to the jaw clutches 54. In the event that it may be necessary or desirable to turn the unloader in connection with movement thereof into and out of unloading position, one of the wheels 7 may be driven by the motor and the other locked against rotation.

Whereas the invention has been described in connection with a car unloader of the chain-and-drag type, it is to be understood that certain phases or features of the invention may be used in connection with belt unloaders and portable conveyors of the belt or chain-and-drag type. It is also to be understood that the invention is not to be restricted to the details set forth, since these may be modified within the scope of the appended claims, without departing from the spirit and scope of the invention.

Having thus described the invention, what I claim as new and desire to secure by Letters Patent, is:

1. In conveying apparatus of the character described, the combination of an elongated frame, a motor-driven endless conveyor supported by and extending lengthwise of the frame, a pair of frame-supporting wheels at opposite sides of the frame, a transversely extending shaft supported by the frame adjacent to the wheels and connected to be driven directly from the conveyor, and means forming a driving connection between the shaft and the wheels whereby the wheels may be driven for frame-propelling purposes during drive of the conveyor.

2. In conveying apparatus of the character described, the combination of an elongated frame, a motor-driven endless conveyor of the chain and drag-bar type supported by and extending lengthwise of the frame, a pair of frame-supporting wheels at opposite sides of the frame, a transversely extending shaft supported by the frame adjacent to the wheels and having a sprocket thereon meshing directly with one of the chains of the conveyor and serving to drive the shaft during drive of the conveyor, and means forming a driving connection between the shaft and the wheels whereby the wheels may be driven for frame-propelling purposes during drive of the conveyor.

3. In conveying apparatus of the character described, the combination of an elongated frame, a motor-driven endless conveyor of the chain and drag-bar type supported by and extending lengthwise of the frame, a pair of frame-supporting wheels positioned at opposite sides of the frame and provided with gears around the rims thereof, a transversely extending shaft supported by the frame adjacent to the wheels and having sprockets thereon meshing directly with the chains of the conveyor and serving to drive the shaft during drive of the conveyor, and a pair of pinions mounted on the ends of the shaft and meshing with the gears on the wheels to form driving connections whereby the wheels may be driven from the shaft for frame-propelling purposes.

4. In conveying apparatus of the character described, the combination of an elongated frame, an endless conveyor supported by and extending lengthwise of the frame, a motor for driving the conveyor, a pair of frame-supporting wheels positioned at opposite sides of the frame and provided with gears around the rims thereof, a shaft positioned transversely of the frame and adjacent to the wheels and connected to be driven by the motor, a pair of pinions rotatably mounted on the ends of the shaft and meshing with the aforesaid gears around the rims of the wheels, clutches for connecting the pinions to be driven by the shaft in order to form driving connections whereby the wheels are driven from the motor for frame-propelling purposes, and a pair of levers at one side of the frame for individually bringing the pinions into clutched relation with their respective clutches.

5. In conveying apparatus of the character described, the combination of an elongated frame, an endless conveyor supported by and extending lengthwise of the frame, a motor for driving the conveyor, a pair of frame-supporting wheels positioned at opposite sides of the frame and provided with gears around the rims thereof, a shaft positioned transversely of the frame and adjacent to the wheels and connected to be driven by the motor, a pair of pinions slidably and rotatably mounted on the ends of the shaft and meshing with the aforesaid gears around the rims of the wheels, and clutches operative in response to shift of the pinions in one direction to connect the pinions for drive by the shaft and form driving connections whereby the wheels are driven from the motor for frame-propelling purposes.

6. In conveying apparatus of the character described, the combination of an elongated frame, an endless conveyor supported by and extending lengthwise of the frame, a motor for driving the conveyor, a pair of frame-supporting wheels positioned at opposite sides of the frame and provided with gears around the rims thereof, a shaft positioned transversely of the frame and adjacent to the wheels and connected to be driven by the motor, a pair of pinions slidably and rotatably mounted on the ends of the shaft and meshing with the aforesaid gears around the rims of the wheels, jaw clutches operative in response to shift of the pinions in one direction to connect the pinions for drive by the shaft and form driving connections whereby the wheels are driven from the motor for frame-propelling purposes, and levers supported at one side of the frame and connected to the pinions so that the latter may be shifted individually.

7. In conveying apparatus of the character described, the combination of an elongated frame, an endless conveyor supported by and extending lengthwise of the frame, a motor for driving the conveyor, a pair of frame-supporting wheels positioned at opposite sides of the frame and provided with gears around the rims thereof, a shaft positioned transversely of the frame and adjacent to the wheels and connected to be driven by the motor, a pair of pinions mounted rotatably and slidably on the ends of the shaft and meshing with the gears around the rims of the wheels, clutches for connecting the pinions to be driven by the shaft in order to form driving connections whereby the wheels are driven from the motor for frame-propelling purposes, and means for securing the pinions against rotation when they are in declutched position in order to effect locking of the wheels.

8. In conveying apparatus of the character described, the combination of an elongated frame, an endless conveyor supported by and extending lengthwise of the frame, a motor for driving the conveyor, a pair of frame-supporting wheels positioned at opposite sides of the frame and provided with gears around the rims thereof, a shaft positioned transversely of the frame and adjacent to the wheels and connected to be driven by the motor, a pair of pinions mounted slidably and rotatably on the ends of the shaft and meshing with the gears around the rims of the wheels, clutches operative in response to shift of the pinions in one direction to connect the pinions for drive by the shaft and form driving connections whereby the wheels are driven from the motor for frame-propelling purposes, and clutches operative in response to shift of the pinions in the opposite directions to secure the pinions against rotation relatively to the shaft and to lock the wheels in place.

9. In conveying apparatus of the character described, the combination of an elongated frame, an endless conveyor supported by and extending lengthwise of the frame, a motor for driving the conveyor, a pair of frame-supporting wheels positioned at opposite sides of the frame and provided with gears around the rims thereof, a shaft positioned transversely of the frame and adjacent to the wheels and connected to be driven by the motor, a pair of pinions mounted slidably and rotatably on the ends of the shaft and meshing with the gears around the rims of the wheel, jaw clutches at the extreme outer ends of the shaft operative in response to outward shift of the pinions to connect the pinions for drive by the shaft and form driving connections whereby the wheels are driven from the shaft for frame-propelling purposes, jaw clutches operative in response to inward shift of the pinions on the shaft to secure the pinions against rotation in order to lock the wheels in place, and levers for individually shifting the pinions mounted at one side of the frame.

10. In conveying apparatus of the character described, the combination of an elongated frame adapted to extend substantially horizontally, an endless conveyor supported by and extending lengthwise of the frame, a motor for driving the conveyor mounted on the frame, a horizontal shaft carried by the frame-sides and connected to be driven by the motor, a pair of frame-supporting wheels positioned at opposite sides of the frame and provided with gears around the rims thereof, a pair of cranks projecting radially from the ends of the shaft and provided with stub axles for the wheels, and pinions on the ends of the shaft meshing with the gears on the wheels and forming driving connections whereby the wheels may be driven from the shaft for frame-propelling purposes, said cranks being mounted to swing vertically around the shaft so as to permit of vertical adjustment of the frame without disturbing the driving connections between the shaft and the wheels.

11. In conveying apparatus of the character described, the combination of an elongated frame, an endless conveyor supported by and extending lengthwise of the frame, a motor for driving the conveyor, a pair of frame-supporting wheels positioned at opposite sides of the frame and provided with gears around the rims thereof, a shaft positioned transversely of the frame and adjacent to the wheels and adapted to be driven by the motor, a pair of pinion-members mounted on the ends of the shaft and meshing with the aforesaid gears around the rims of the wheels, a pair of clutch-members for connecting the pinion-members for drive by the shaft in order to form driving connections whereby the wheels are driven from the motor for frame-propelling purposes, and a pair of levers at one side of the frame for individually bringing one pair of members into clutched relation with the other pair.

12. In conveying apparatus of the character described, the combination of an elongated frame, an endless conveyor supported by and extending lengthwise of the frame, a motor for driving the conveyor, a pair of frame-supporting wheels positioned at opposite sides of the frame and provided with gears around the rims thereof, a shaft positioned transversely of the frame and adjacent to the wheels and adapted to be driven by the motor, a pair of pinions mounted on the ends of the shaft and meshing with the gears around the rims of the wheels, clutches for connecting the pinions for drive by the shaft in order to form driving connections whereby the wheels are driven from the motor for frame-propelling purposes, and means for securing the pinions against rotation when they are in declutched position in order to effect locking of the wheels.

13. In conveying apparatus of the character described, the combination of an elongated frame, an endless conveyor supported by and extending lengthwise of the frame, a motor for driving the conveyor, a pair of frame-supporting wheels positioned at opposite sides of the frame and provided with gears around the rims thereof, a shaft positioned transversely of the frame and adjacent to the wheels and adapted to be driven by the motor, a pair of pinion-members mounted on the ends of the shaft and meshing with the gears around the rims of the wheels, a pair of clutch-members operative in response to shift of one pair of members in one direction to connect the pinion-members for drive by the shaft and to form driving connections whereby the wheels are driven from the motor for frame-propelling purposes, and fixed clutches operative in response to shift of said one pair of members in the opposite direction to secure the pinion-members against rotation and to lock the wheels in place.

14. In conveying apparatus of the character described, the combination of an elongated frame, an endless conveyor supported by and extending lengthwise of the frame, a motor for driving the conveyor, a pair of frame-supporting wheels positioned at opposite sides of the frame and provided with gears around the rims thereof, a shaft positioned transversely of the frame and adjacent to the wheels and adapted to be driven by the motor, a pair of pinion-members mounted on the ends of the shaft and meshing with the gears around the rims of the wheel, a pair of jaw clutch-members operative in response to outward shift of one pair of members to connect the pinion-members for drive by the shaft and to form driving connections whereby the wheels are driven through the medium of the shaft for frame-propelling purposes, a pair of fixed jaw clutches operative in response to inward shift of said one pair of members to secure the pinion-members against rotation in order to lock the wheels in place, and levers for individually shifting the members of said one pair mounted at one side of the frame.

FRANK P. CULLEN.